July 9, 1929.　　　　　G. RETIF　　　　1,720,571
APPARATUS FOR EXERCISING THE FINGERS
Filed June 25, 1923　　2 Sheets-Sheet 1
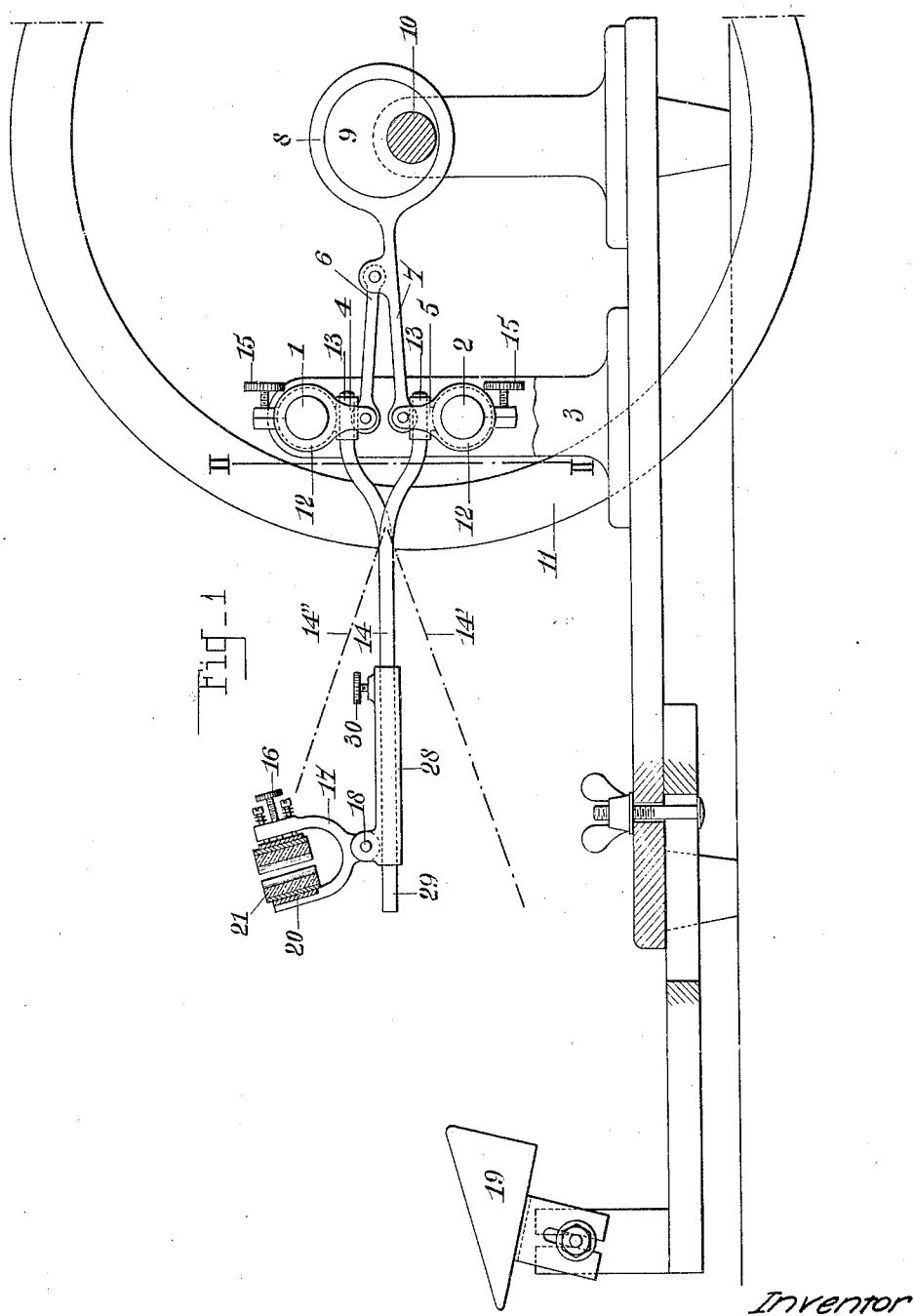
Inventor
G. Retif
by Langner, Parry, Card & Langner
Attys July 9, 1929.  G. RETIF  1,720,571
APPARATUS FOR EXERCISING THE FINGERS
Filed June 25, 1923   2 Sheets-Sheet 2
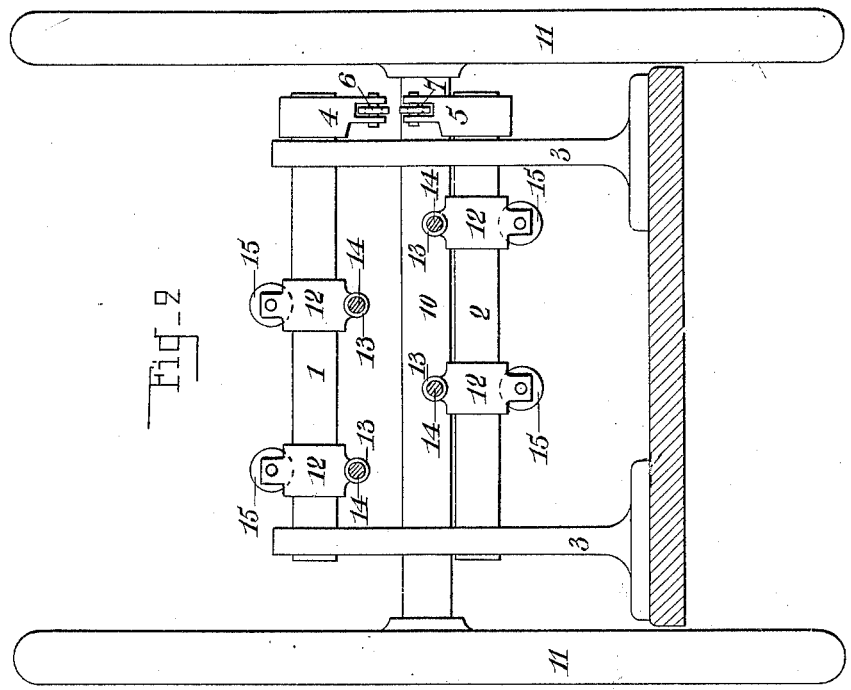
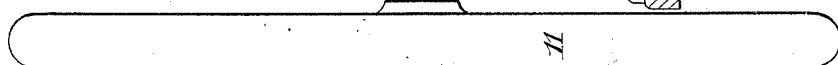

Patented July 9, 1929.

1,720,571

UNITED STATES PATENT OFFICE.

GEORGES RETIF, OF SANCOINS, FRANCE; M. EMILE GAYMY, OF SANCOINS, FRANCE, ADMINISTRATOR OF SAID GEORGES RETIF, DECEASED.

APPARATUS FOR EXERCISING THE FINGERS.

Application filed June 25, 1923, Serial No. 647,720, and in Germany July 14, 1922.

Skill in playing musical instruments is acquired only after prolonged practice which endows the performer's fingers with nimbleness, independent action and strength, the object of the musical exercises performed by the student being to develop certain motive muscles of the fingers and to render their action independent, since naturally these muscles have a tendency to act in pairs, the one drawing on the other.

The object of the present invention is to replace this long, arduous study which, in the case of students of no great talent, is sometimes without success, by an adaptation of the muscles acquired mechanically and without the exertion of personal attention by means of a mechanical device constraining the fingers to execute, with as great a speed as may be desired, movements analogous to those executed by a performer on the keyboard of his instrument, the movements of the fingers being combined so as to follow one another in a sequence and at intervals forming a constantly-renewed cycle similar to the musical time of the exercises which students are required to repeat a great number of times. In applying the process forming the object of the present invention, the part of the operator is reduced to a simple, passive resistance or contraction opposed to the forced movements which are necessarily given to the fingers by the apparatus employed, this passive resistance or contraction constituting a muscular effort equal to that which is exerted actively by the student performing on his instrument.

By way of example and to render the description readily understood, there is shown in the accompanying drawing a form of construction of the apparatus in question applicable to four fingers of either hand and adapted to effect any succession of movement desired, according to the adjustment of certain parts.

Fig. 1 is a sectional side elevation of the device in question.

Fig. 2 is a corresponding front elevation, viewed from left to right and

Fig. 3 is a front view of a special form of the rest and holding device for the wrist.

The construction is characterized by the fact that the movement of the fingers is produced by means of two shafts actuated by an oscillatory movement about their respective axes and upon which are keyed, in the desired position, oscillating levers to which the fingers are secured.

The two shafts 1 and 2, carried by supports 3, are provided at one of their ends with cranks 4, 5, rigidly fixed thereon. The ends of these cranks are articulated on the levers 6, 7, one of which is integral with the collar 8 of an eccentric 9 mounted on a shaft 10. The rotary movement imparted to a flywheel 11 keyed to the shaft 10 will cause the shafts 1, 2, to oscillate.

These shafts carry altogether as many collars 12 as there are fingers, and on each of these collars a swivel lever 14 is fixed by means of a sleeve 13. The fixing of the collars 12 on the shafts 1 and 2 and, consequently, the initial position of the levers 14 is secured by means of the set screw 15 or by any other suitable method of fixing. When the eccentric is in the position shown in Fig. 1, the levers 14 are in the mean position: when the fly-wheel has performed a quarter revolution the levers 14 keyed to the shaft 1 are in the position 14' (Fig. 1) and the levers keyed to the shaft 2 are in the position 14''. It is seen, therefore, that the levers 14 mounted on one of the shafts follow the inverse movement of that of the levers keyed to the second shaft: thus it is possible to perform different exercises, according to the positions given to the collars 12 on these two shafts.

The fingers are held in the grips 20, which are provided with a resilient lining 21 and adapted to be tightened by means of the spring screws 16. These grips are supported by the fork stay 17 pivoted at 18 on the swivel levers. When using the appliance, the wrist of the operator rests on a support 19, the inclination, height and position of which are adjustable by means of a set screw and slides of any kind.

It is well to keep the student's wrist motionless while the apparatus is in use. For this purpose, there is added to the wrist support a fixing device constituted by a small plate 22 provided with a padding 23, 24. A screw 25 co-operating with a nut 26 fixed on a strap 27 permits of effecting the necessary tightening.

The range of movement of the fingers is easily regulated in consequence of the fact that the finger grips 20 are pivoted on a guide 28 adapted to slide on the end 29 of the levers 14 and to be fixed in the desired position by tightening the screw 30.

The apparatus thus constituted functions in the following manner:

The operator fixes his fingers in the grips 20 and sets in motion the flywheel 11. This movement forces the fingers to perform the movements produced by the levers, while the operator opposes a slight passive resistance to the forced movement to which he is subjected, which, on the one hand, renders the joints of the hand supple and, on the other, develops the independent action of all the muscles. The fingers being firmly pressed by the screws 16 are obliged not only to follow the upward movements of the levers 14, but also the downward movements. Thus, owing to the passive resistance opposed by the hand, all the muscles, both the lifting muscles as well as lowering muscles, are exercised.

In the constructional example described above and shown in the accompanying drawing, only four levers are provided for four fingers, but the invention also comprises forms of embodiment in which a special lever for the thumb is provided, this lever being movable either about the same axis as the others or about a different axis. The apparatus could likewise comprise two series of finger grips constructed according to the above-described example, one set for each hand, the flywheel being then actuated by a treadle or by a motor.

It is to be observed that the drive of the shafts 1 and 2 by means of the eccentric as described above, may be effected in any other manner, for example by a rod and crank. Moreover, the number of rocking shafts such as 1 and 2 may vary according to requirements.

Having now particularly described and ascertained the nature of my said invention and in what manner the same is to be performed, I declare that what I claim is:

1. Apparatus for exercising the fingers, comprising in combination, a plurality of pivoted levers, a finger grip carried by each lever, and screw tightening means in each grip for permitting each grip to nondetachably hold a finger at the end only, and means for imparting alternating movements to the levers, each finger grip including, a fork, a fixed elastic lining on one inner side of the fork, a movable elastic lining on the other inner side of the fork, and a tightening screw for moving the movable, toward the fixed, lining.

2. Apparatus for exercising the fingers, comprising in combination, a plurality of pivoted levers, a finger grip carried by each lever, and screw tightening means in each grip for permitting each grip to nondetachably hold a finger at the end only, and means for imparting alternating movements to the levers, each finger grip including, a fork, a fixed elastic lining on one inner side of the fork, a movable elastic lining on the other inner side of the fork, and a tightening screw for moving the movable, toward the fixed, lining, and spring means positioned between the movable lining and the fork.

3. Apparatus for exercising the fingers, comprising, in combination, screw operated grips for holding the fingers by their ends only, and means for imparting alternating movements to the grips, such means including, a drive shaft, a fly wheel on the drive shaft, a crank on the shaft, two driven shafts, means connecting the crank to the driven shafts, screw operated collars adjustably positioned on the driven shafts, levers carried by the collars, and an adjustable sleeve on each lever carrying one of said grips.

4. Apparatus for exercising the fingers, comprising in combination, a plurality of pivoted levers, a finger grip carried by each lever, each finger grip comprising, oppositely disposed clamping members engageable with opposite sides of the finger, means for adjustably tightening the members against the finger and means for imparting alternate movement to said levers.

5. Apparatus for exercising the fingers comprising in combination, a plurality of pivoted levers, a finger grip carried by each lever, each finger grip comprising, oppositely disposed substantially rigid clamping members engageable with opposite sides of the finger, a screw for adjustably tightening said members against the fingers and means for imparting alternate movements to said levers.

6. In an apparatus according to claim 4, the provision of means to independently regulate the position of each of the levers with respect to its pivotal axis, for the purpose of regulating the amplitude of movement of the fingers as desired.

In testimony whereof I have signed my name to this specification.

GEORGES RETIF.